US008331240B2

(12) United States Patent
Voglewede et al.

(10) Patent No.: US 8,331,240 B2
(45) Date of Patent: Dec. 11, 2012

(54) PROMISCUOUS MONITORING USING INTERNET PROTOCOL ENABLED DEVICES

(75) Inventors: Paul Voglewede, N. Chili, NY (US); Peter J. Roth, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 343 days.

(21) Appl. No.: 11/937,002

(22) Filed: Nov. 8, 2007

(65) Prior Publication Data

US 2009/0122709 A1 May 14, 2009

(51) Int. Cl.
*G01R 31/08* (2006.01)
(52) U.S. Cl. ........................................ 370/241
(58) Field of Classification Search .......... 370/203, 370/216–228, 229–237, 241–249, 254–258, 370/310–329, 339–349, 395.1–395.5, 431–441
See application file for complete search history.

(56) References Cited

U.S. PATENT DOCUMENTS

| | | | |
|---|---|---|---|
| 6,985,440 B1* | 1/2006 | Albert et al. ............... | 370/230 |
| 7,116,640 B2* | 10/2006 | Tasman et al. ............. | 370/252 |
| 7,489,688 B2* | 2/2009 | Giesberts et al. ........... | 370/392 |
| 7,656,908 B1* | 2/2010 | Begeja ....................... | 370/507 |
| 7,719,995 B2* | 5/2010 | Luft ........................... | 370/252 |
| 2004/0008676 A1* | 1/2004 | Thomas ...................... | 370/389 |
| 2004/0028000 A1 | 2/2004 | Billhartz | |
| 2004/0028001 A1* | 2/2004 | Billhartz .................... | 370/312 |
| 2004/0208189 A1* | 10/2004 | Fukuda ....................... | 370/401 |
| 2005/0135242 A1 | 6/2005 | Larsen et al. | |
| 2005/0169232 A1* | 8/2005 | Sakoda et al. ............... | 370/347 |
| 2006/0018335 A1* | 1/2006 | Koch et al. .................. | 370/432 |
| 2006/0109859 A1 | 5/2006 | Acharya et al. | |
| 2006/0268766 A1* | 11/2006 | Rangarajan et al. .......... | 370/328 |
| 2006/0294579 A1* | 12/2006 | Khuti et al. ................. | 726/3 |
| 2007/0002858 A1* | 1/2007 | Bichot et al. ................ | 370/390 |
| 2007/0101020 A1* | 5/2007 | Lin et al. .................... | 709/238 |
| 2007/0147411 A1* | 6/2007 | Bijwaard et al. ............ | 370/432 |
| 2007/0160046 A1* | 7/2007 | Matta .......................... | 370/390 |
| 2007/0168523 A1* | 7/2007 | Jiang et al. .................. | 709/228 |

(Continued)

OTHER PUBLICATIONS

Kappes, M., "An Application-Layer Approach for Multi-Hop Communication in IEEE 802.11 Ad-Hoc Networks". Wireless Communications and Networking Conference, 2004. WCNC. 2004 IEEE Atlanta, GA, USA, Mar. 21-25, 2004. Piscataway, NJ, USA, IEEE, vol. 3, Mar. 21, 2004) pp. 1359-1364, XP010707956. ISBN: 978-0-7803-8344-9.

*Primary Examiner* — Kwang B Yao
*Assistant Examiner* — Jung-Jen Liu
(74) *Attorney, Agent, or Firm* — Fox Rothschild, LLP; Robert J. Sacco (57) ABSTRACT

A method (500) is provided for enabling a promiscuous monitoring of network communications by a monitor node (MN). The method includes the steps of: generating a directed IP packet at a first node (FN); transmitting a first unicast signal including a RTS message from the FN to a second node (SN); transmitting a second unicast signal including a CTS message from the SN to the FN in response to the first unicast signal; modifying the directed IP packet by changing an IP destination address of the directed IP packet to an IP subnet broadcast address; transmitting a uni-broadcast signal including the modified directed IP packet from the FN to the IP subnet broadcast address; and receiving the uni-broadcast signal at the SN and a third node (TN). The TN is an IP-enabled device provided to monitor network communications between the FN and SN.

16 Claims, 7 Drawing Sheets

U.S. PATENT DOCUMENTS

| | | |
|---|---|---|
| 2007/0194906 A1* | 8/2007 | Sink |
| 2007/0248067 A1* | 10/2007 | Banerjea et al. .............. 370/338 |
| 2008/0047009 A1* | 2/2008 | Overcash et al. ............... 726/23 |
| 2008/0072041 A1* | 3/2008 | Na ............................... 713/163 |
| 2008/0075010 A1* | 3/2008 | Song ............................ 370/238 |
| 2008/0181130 A1* | 7/2008 | Balu et al. |
| 2009/0016280 A1* | 1/2009 | Iyer et al. ..................... 370/329 |

* cited by examiner

PROMISCUOUS MONITORING USING INTERNET PROTOCOL ENABLED DEVICES

BACKGROUND OF THE INVENTION

1. Statement of the Technical Field

The invention concerns communications networks. More particularly, the invention relates to an improved method for enabling the promiscuous monitoring of network communications by an internet protocol enabled device.

2. Description of the Related Art

Wireless networks are well known in the art. Such networks generally include a plurality of individual nodes that communicate with one another using wireless means. In order to ensure that each message is exclusively communicated to a desired node, each node can have an address. Messages transmitted between nodes can be addressed exclusively to the particular node for which the message is intended.

In some instances, the individual nodes may be required to operate using battery power. Accordingly, it is important to minimize power consumption by such nodes. One method of minimizing power consumption in each node is to limit the amount of time during which the receiver circuitry in each node is powered on. When such power saving measures are in use, transmissions from a first node can be chronologically coordinated with receiver activation in a second node.

In certain instances, it can be advantageous to monitor the communications that occur between nodes comprising a wireless network. However, such monitoring can be hindered by the fact that messages transmitted between nodes are addressed exclusively to the particular node for which the message is intended. Conventional equipment used to monitor a wireless network will ignore such messages if the messages are not specifically addressed to the monitoring device.

One method of overcoming the monitoring problem would be to modify the conventional monitoring equipment to process received messages, regardless of the specific address to which the messages are directed. However, modification of equipment already in the field is expensive and time consuming.

Another method for overcoming this monitoring problem would be to avoid the use of directed messages that are addressed exclusively to particular nodes. Instead, a predefined broadcast address can be used for all communications among nodes. A message with a broadcast address will be processed by all nodes in the network (including the monitoring device) that receive such a message. Such an approach can solve the monitoring problem. However, broadcast communication of all network messages can create further problems. For example, such broadcast type messaging can create confusion among the various nodes when attempting to coordinate transmissions with receiver activations at specific nodes.

SUMMARY OF THE INVENTION

The present invention concerns a method for enabling a promiscuous monitoring of network communications by an IP-enabled device. The method includes the step of generating a directed IP packet at a first node. The method also includes the step of modifying the directed IP packet by changing an IP destination address of the directed IP packet to an IP subnet broadcast address. The IP destination address is an IP destination address of a network layer protocol header. The method further involves the step of transmitting a uni-broadcast signal including the directed IP packet that has been modified from the first node to the IP subnet broadcast address. The uni-broadcast signal is received at a second node and a third node. The third node is an IP-enabled device provided for monitoring communications between the first and second nodes.

According to an aspect of the invention, the method involves transmitting a first unicast signal including a request to send message from the first node to a second node prior to transmitting the uni-broadcast signal. More particularly, the request to send message is transmitted in a MAC layer signal burst from the first node to the second node. The method also involves transmitting a second unicast signal including a clear to send message from the second node to the first node in response to the first unicast signal. More particularly, the clear to send message is transmitted in a MAC layer signal burst from the second node to the first node.

According to another aspect of the invention, the method includes the step of transmitting a MAC layer data burst including the directed IP packet that has been modified from the first node to the IP subnet broadcast address. The method also includes the step of processing the directed IP packet at the third node as broadcast traffic. The method further includes the step of transmitting a unicast signal including a drop link message from the second node to the first node after the second node receives the uni-broadcast signal.

According to another aspect of the invention, the first node is a sensor node. The second node is a relay node that is part of a route to a central node. In such a scenario, the method can include the step of detecting an intrusion or message at the sensor node and generating a directed IP packet in response to detecting the intrusion or message.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Figure 1:
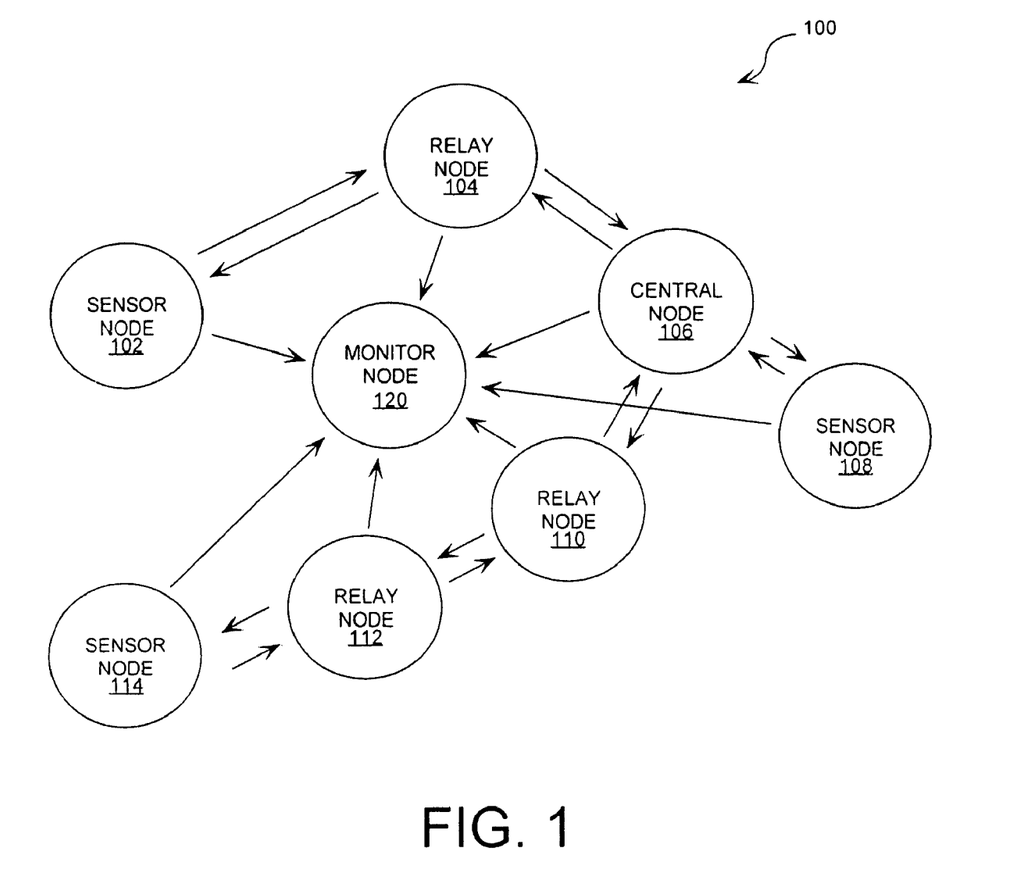
FIG. 1 is a block diagram of a wireless network that is useful for understanding the present invention.

Referring now to FIG. 1, there is provided a block diagram of a low power, wireless network 100 that is useful for understanding the present invention. The wireless network 100 is comprised of two or more nodes that are useful for monitoring physical activity within a predetermined area. However, it should be appreciated that the invention described herein can be used with any low power wireless network. Three basic types of nodes are included in the network 100. Specifically, the network 100 includes sensor nodes 102, 108, 114, relay nodes 104, 110, 112, and a central node 106 (collectively referred to herein as "nodes"). Sensor nodes 102, 108, 114 are positioned at remote locations in the field for detecting various types of activity. The central node 106 is typically located at a base location for monitoring the activity reported by the sensor nodes 102, 108, 114. The relay nodes 104, 110, 112 are located between the sensor nodes 102, 108, 114 and the central node 106 for relaying data communications from the sensor nodes 102, 108, 114 to the central node 106.

Each sensor node 102, 108, 114 can be an intrusion detection device configured to perform physical observations. Thus, each sensor node 102, 108, 114 can include a geophone, a magnetometer, a passive inferred detector and/or the like. In order to conserve power, sensor nodes 102, 108, 114 will generally deactivate their receiver circuitry except during periods of time when transmissions from other nodes are expected. More particularly, a sensor node 102, 108, 114 will not generally turn on its receiver except for those periods following one of the sensor node's transmissions that is intended to elicit a response from another node. Sensor nodes 102, 108, 114 will also deactivate their transmit circuitry except for periods of time when they are attempting to join the network, synchronize timing, or communicate a notification. These processes are described in more detail in relation to the network initialization descriptions provided below.

Relay nodes 104, 110, 112 operate somewhat differently as compared to sensor nodes 102, 108, 114. The relay nodes 104, 110, 112 operate in accordance with a timing cycle or epoch, which is continually repeated at each relay node. During a portion of each timing cycle, the relay nodes 104, 110, 112 will automatically activate their receiver circuitry. For example, the epoch or timing cycle can be a total of five seconds in duration, and the receiver circuitry can be active or turned on during one (1) second out the total five second duration. The epoch or timing cycle is repeated continuously at each node so that the receiver is periodically activated for receiving signals.

The invention is not limited with regard to the duration of the timing cycle or the duration of receiver activation time. These times can be adjusted in accordance with a particular system design. However, such relay node receiver activation preferably has a relatively low duty cycle, such that the receiver is off most of the time. During those time periods when the receiver is active, the relay node 104, 110, 112 will actively listen for communications from other nodes that are attempting to join the network and will actively listen for request-to-send (RTS) notifications from other nodes, which indicate that such other nodes are seeking to send a data transmission to the relay node 104, 110, 112. These various types of communications are discussed in greater detail below.

Notably, it is advantageous to have the duty cycle for receiver activation in each node be as low as reasonably possible for purposes of conserving battery power. For example, in an embodiment of the invention, the receiver duty cycles can be ten percent (10%) or less. A ten percent (10%) receiver duty cycle means that a receiver is operational (i.e. turned on) only ten percent (10%) of any time period during which the node is otherwise active. Tradeoffs between system timing accuracy, power consumption and system throughput delay must be taken into consideration when determining the duty cycle.

The timing cycle or epoch of each relay node is not synchronized with the other nodes in the network. Accordingly, each relay node of the wireless network 100 will activate it's receiver during an arbitrary period of time in accordance with the timing cycle of that relay node. As such, it is important that each relay node of the wireless network 100 communicates to other nodes in the wireless network 100 information indicating when its receiver will be active. Communication of synchronization information occurs during a join attempt, i.e. when a node is attempting to join the network. Upon receipt of such a communication, a receiving node will use the information to synchronizate communications between itself and the respective node.

Central nodes 106 function differently as compared to sensor nodes 102, 108, 114 and relay nodes 104, 110, 112. A central node 106 will generally include a computer processing system executing a sensor management application and configured to receive sensor information. For example, the computer processing system is advantageously configured to process the sensor information to determine if a vehicle, animal, person or object present within a particular geographic area is an intruder. The computer processing system is coupled to a wireless transceiver. The central node 106 will generally be located at a base facility. Accordingly, power conservation is of considerably less concern for the central node 106 as compared to the sensor nodes 102, 108, 114 and relay nodes 104, 110, 112 which are remotely located in the field. In view of the foregoing, it is anticipated that the receiver circuitry for the central node 106 will operate continuously (100% duty cycle). Still, the invention is not limited in this regard and the receiver circuitry at the central node 106 can operate at less than a one hundred percent (100%) duty cycle.

When a network is to be established, sensor nodes, relay nodes and a central node 102, . . . , 114 can be positioned by a technician. The sensor nodes 102, 114, 108 are typically positioned around a perimeter or at selected locations to be monitored. Relay nodes 104, 112 are positioned as necessary to facilitate data communications from the sensor nodes 102, 108, 114 to the central node 106. In this regard, it should be noted that each sensor node, relay node and central node 102, . . . , 114 is located a certain distance from another node. The distance is selected in accordance with a particular wireless network application. For example, if each node 102, . . . , 114 has a maximum connection distance of five (5) miles, then a sensor node 102 is preferably placed at a location that is less than five (5) miles from the relay node 104. Similarly, the relay node 104 is preferably placed at a location that is less than five (5) miles from the central node 106, and so on. Still, it will be appreciated by those skilled in the art that the maximum actual distance between nodes will depend on the communication range capability of each node. For example, for communications between nodes up to 5 miles apart, a VHF or UHF frequency band can be selected. Still, it should be understood that the invention can be used for wireless network communications at any frequency.

Nodes 102, . . . , 114 advantageously communicate with one another using a defined communication protocol. For example, the defined communication protocol is advantageously selected to include an internet protocol (IP) based communication protocol. IP communication protocols are well known in the art, and therefore will not be described here in detail.

Referring again to FIG. 1, the node 120 is a monitor node. A monitor node is an IP-enabled device configured to monitor communications between sensor nodes 102, 110, 114, relay nodes 104, 108, 112 and central nodes 106 in the wireless network 100. Such IP-enabled devices include, but are not limited to, handheld communications devices and communications devices mounted in vehicles. For example, the monitor node 120 can be a handheld radio configured to monitor signal transmissions between a sensor node 102 and a relay node 104. The monitor node can also include processing capabilities as necessary to process and decode messages transmitted among the various nodes in the network 100 using the IP based communication protocol. Still, the invention is not limited in this regard.

In a wireless computer network, communications protocols are commonly implemented using the International Standards Organization (ISO) Model for Open Systems Interconnection (OSI). This international standard is sometimes referred to as the OSI reference model. For purposes of the present invention, particular attention is directed to two specific layers of the OSI reference model that contain address information. These two addressing layers are commonly referred to as the data link and network layers.

Figure 2:
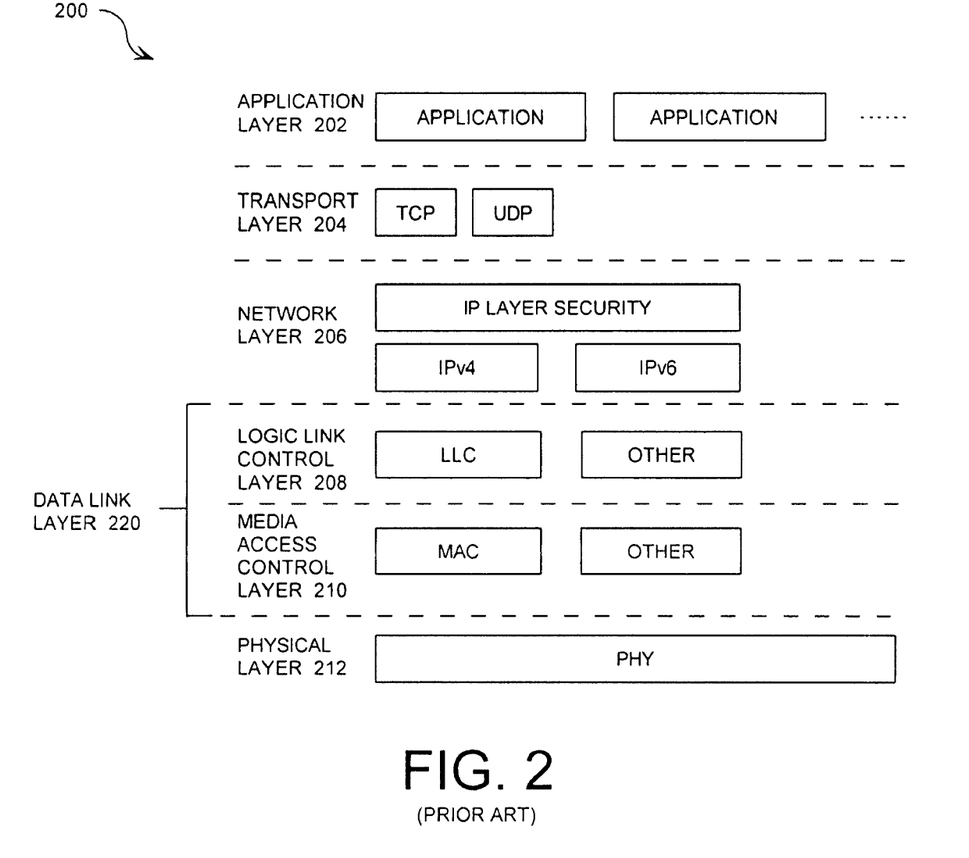
FIG. 2 is a block diagram of a protocol stack for the communications system of FIG. 2 that is useful for understanding the present invention.

Referring now to FIG. 2, there is provided a block diagram of a protocol stack for the wireless network 100 of FIG. 1. According to the embodiment shown in FIG. 2, the protocol stack 200 includes five layers 202, 204, 206, 220, 212 specifying particular functions of the wireless network system 100. Still, the invention is not limited in this regard. The protocol stack 200 can include any number of layers in accordance with a particular wireless network 100 application. For example, if an open system interconnection (OSI) protocol stack is employed by the wireless network 100 then the protocol stack 200 can further include a session layer and a presentation layer.

Referring again to FIG. 2, the protocol stack 200 provides a framework illustrating how information is passed from a software application installed in a first node 102, . . . , 114, 120 to a software application installed in a second node 102, . . . , 114, 120. The protocol stack 200 is well known to persons skilled in the art. Thus, the protocol stack 200 will not be described in detail herein. However, a brief discussion of the protocol stack 200 is provided below to assist a reader in understanding the present invention.

Referring again to FIG. 2, the protocol stack 200 is comprised of a physical layer 212, a data link layer 220, a network layer 206, a transport layer 204, and an application layer 202. The physical layer 212 is comprised of firmware and/or hardware configured to send and receive data through a wireless network 100. The data link layer 220 provides transmission protocols for transferring data between sensor nodes 102, 108, 114, relay nodes 104, 110, 112, and central nodes 120. Such transmission protocols can include an Ethernet protocol (or an IEEE802.3 protocol), a point-to-point protocol, an IEEE802.11 protocol, an IEEE802.15 protocol, an IEEE802.16 protocol, and other such protocols.

As shown in FIG. 2, the data link layer 220 can be comprised of two (2) sub-layers, namely a logic link control (LLC) layer 208 and a media access control (MAC) layer 210. The logic link control (LLC) layer 208 is comprised of firmware and/or hardware configured to multiplex protocols prior to being transmitted over the media access control (MAC) layer 210 and to demultiplex protocols subsequent to being transmitted and upon receipt. The logic link control (LLC) layer 208 is also comprised of firmware and/or hardware configured to provide flow control of packets, detection of packets, and retransmission of dropped packets.

The media access control (MAC) layer 210 is comprised of firmware and/or hardware configured to determine when to transmit communications and when to receive communications. In this regard, the media access control (MAC) layer 210 performs actions involving coordinating access to a shared radio channel and utilizing protocols that enhance communications over a wireless link. The term "protocol" as used herein refers to a set of rules defining how information is exchanged between nodes. Such nodes include, but are not limited to, the sensor nodes 102, 108, 114 (described above in relation to FIG. 1), the relay nodes 104, 110, 112 (described above in relation to FIG. 1), the central node 106 (described above in relation to FIG. 1) and the monitor node 120 (described above in relation to FIG. 1). The media access control (MAC) layer 210 provides transmission protocols for transferring data between nodes. Such transmission protocols include media access control (MAC) protocols. Media access control (MAC) protocols ensure that signals sent from different nodes across the same channel do not collide.

The network layer 206 is comprised of firmware configured to transfer data from one node to another node. In this regard, the network layer 2306 provides protocols for transferring data from one node to another node. The transmission protocols include routing protocols and forwarding protocols. Such transmission protocols include internet protocols, such as a version four (4) of the internet protocol (IPv4), a version six (6) of the internet protocol (IPv6), and internet security protocols (IP Layer Security).

The transport layer 204 is comprised of firmware configured to communicate data between end systems. In this regard, the transport layer 204 provides transport protocols for transmission of data between end systems. Such transport protocols include a transmission control protocol (TCP) and a user datagram protocol (UDP). The application layer 202 is generally implemented only in firmware. The application layer 202 provides signaling protocols for end-user applications, such as authentication applications, data syntax applications, quality of service applications and end-user applications.

As noted above, the data link layer 220 can be thought of being divided into two sublayers, namely the logical link control (LLC) layer 208 and the media access control (MAC) layer 210. Note that MAC layer address information associated with a packet typically consists of a source MAC address and a destination MAC address. Typically, source and destination MAC addresses are used within a portion of a network that is commonly referred to as the local "subnet". When a packet is communicated from a source node to a final destination node, it can typically pass through multiple nodes. In this regard, the packet is said to go through many "hops" along its route.

It is important to recognize that source and destination MAC addresses are generally used for each single "hop" along a communication path to a final destination. In this regard, it should be understood that a MAC layer address is usually a predefined static address that is permanently associated with an individual network interface of a particular node. For example, this MAC layer address can be stored within a memory associated with each node's network interface circuitry.

Network layer addresses operate differently as compared to MAC layer addresses. Each node of a wireless network has a network layer address (sometimes referred to as an IP address). These network layer addresses or IP addresses can be statically or dynamically assigned to each node. Network layer addresses contained in a packet are carried unchanged from the node that originated the packet to the final destination node, regardless of how many hops the packet transits through. In this regard, network layer addresses remain with the packet from the beginning to the end of its routing process through the various relay nodes of the network.

Figure 3A:
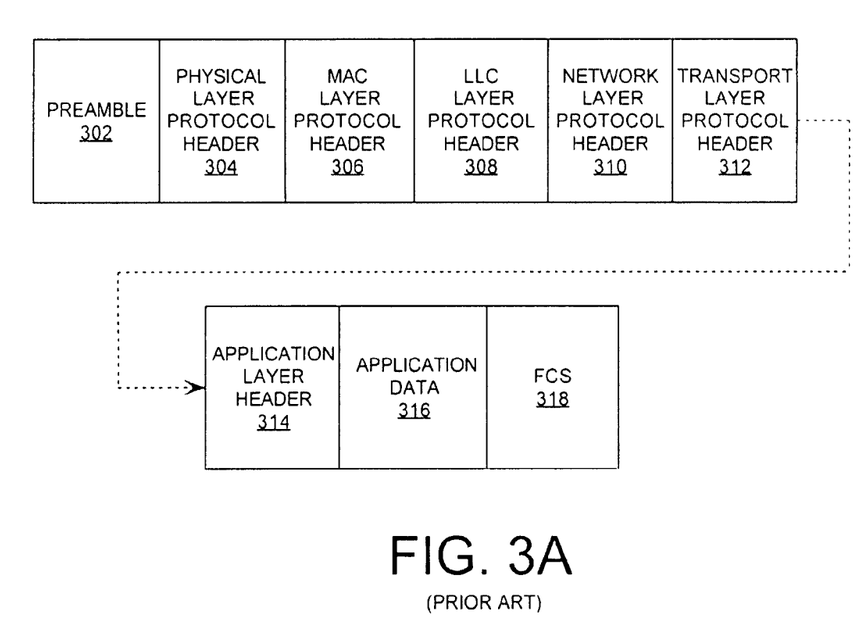
FIG. 3A is a block diagram of a packet that is useful for understanding the present invention.

Referring now to FIG. 3A, there is provided a block diagram of a internet protocol (IP) packet 300 which can be used for communications among the various nodes in a wireless network 100. As shown in FIG. 3A, the IP packet 300 is comprised of a preamble 302, a physical layer protocol header 304, a media access control (MAC) layer protocol header 306, a logic link control (LLC) layer protocol header 308, a network layer protocol header 310 and a transport layer protocol header 312. The IP packet 300 is also comprised of an application layer header 314, an application data 316, and a frame check sequence (FCS) 318. The phrase "frame check sequence" as used herein refers to extra checksum characters added to a packet or a frame in a communication protocol for error detection and correction. Each of the listed components of the IP packet 300 are well known to persons skilled in the art and are well defined in open industry standards of the Institute of Electrical and Electronics Engineers (IEEE) Standard for Local and Metropolitan Area Networks and Internet Engineering Task Force (IEFT). Thus, such components will not be described in detail herein.

Figure 3B:
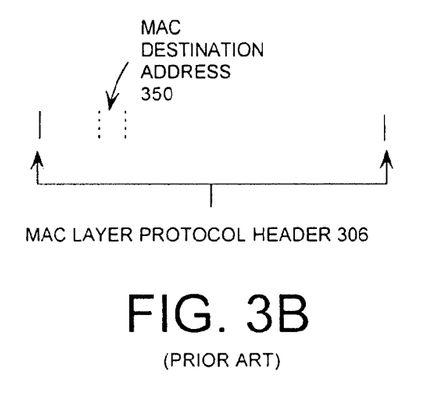
FIG. 3B is a schematic illustration of a MAC layer protocol header that is useful for understanding the present invention.

Referring now to FIG. 3B, there is provided a schematic illustration of a MAC layer protocol header 306 that is useful for understanding the present invention. As shown in FIG. 3B, the MAC layer protocol header 306 is comprised of a MAC destination address 350. MAC destination addresses are well known to those skilled in the art, and therefore will not be described in detail herein. The MAC destination address can be selected to communicate with one specific node. In this regard, it should be understood that the MAC destination address 350 can be a unique address identifying a particular node 102, . . . , 114, 120. This type of messaging is sometimes referred to as a unicast. Alternatively, selected MAC destination addresses called broadcast addresses can also be used. When a MAC destination address is a broadcast address, the message is received and processed by a plurality of nodes in a network, each having a different address.

Figure 3C:
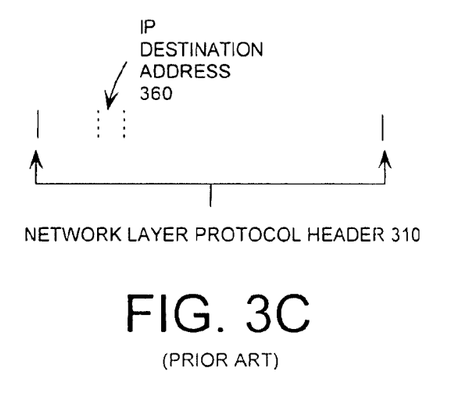
FIG. 3C is a schematic illustration of a Network Layer protocol header that is useful for understanding the present invention.

Referring now to FIG. 3C, there is provided a schematic illustration of a network layer protocol header 310 that is useful for understanding the present invention. As shown in FIG. 3C, the network layer protocol header 310 is comprised of an internet protocol (IP) destination address 360. IP destination addresses are well known to persons skilled in the art, and therefore will not be described in detail herein. The IP destination address can be selected to permit communication with one specific node. In this regard, it should be understood that the IP destination address 360 can be a unique address identifying a particular node 102, . . . , 114, 120. This type of messaging is called a unicast message. Alternatively, selected IP destination addresses called broadcast addresses can also be used. When an IP destination address is a broadcast address, the message is received and processed by a plurality of nodes in a network, each having a different IP addresses.

Figure 4A:
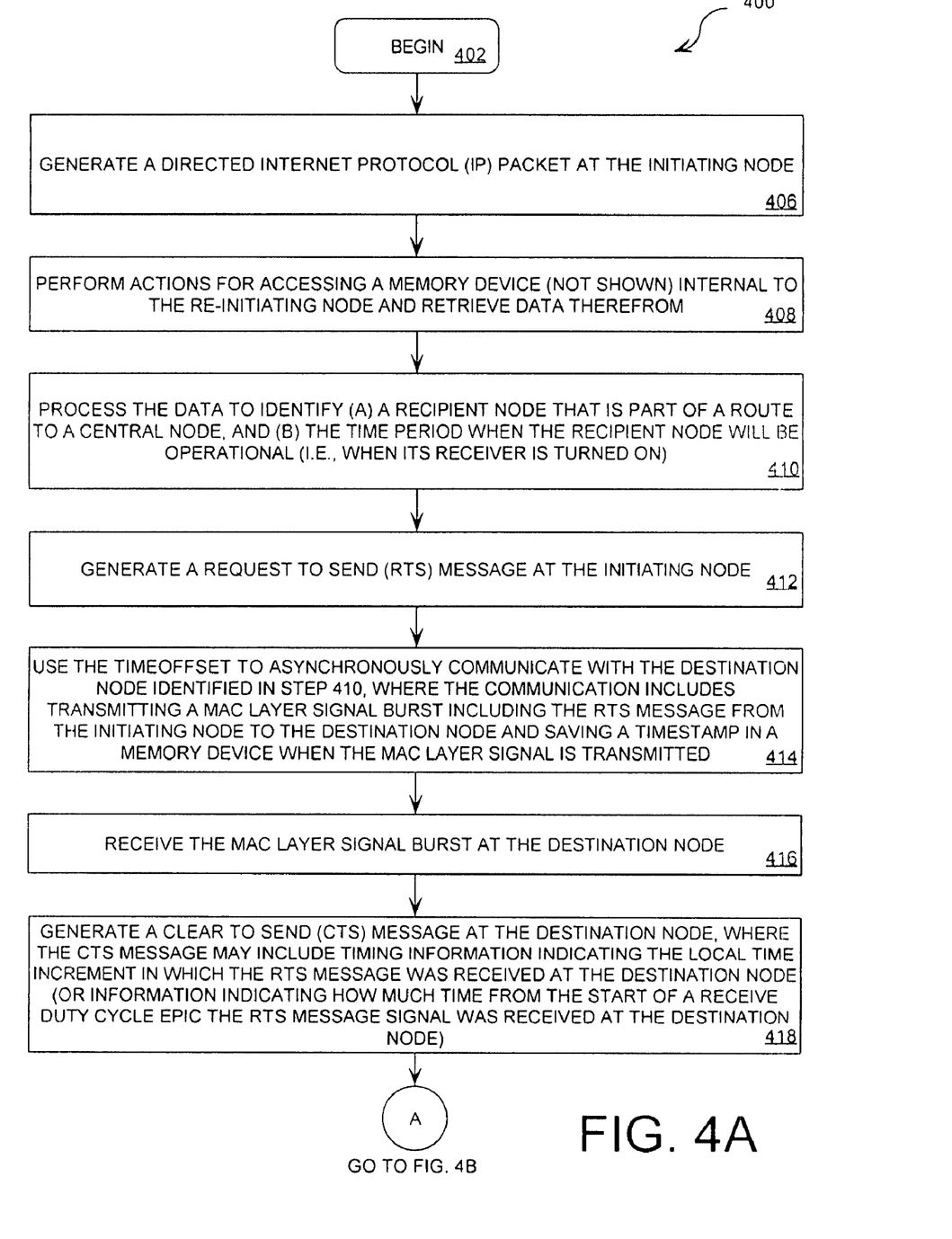
FIGS. 4A-4B collectively provide a flow diagram of an improved method for enabling the promiscuous monitoring of network communications by a monitor node.
Figure 4B:
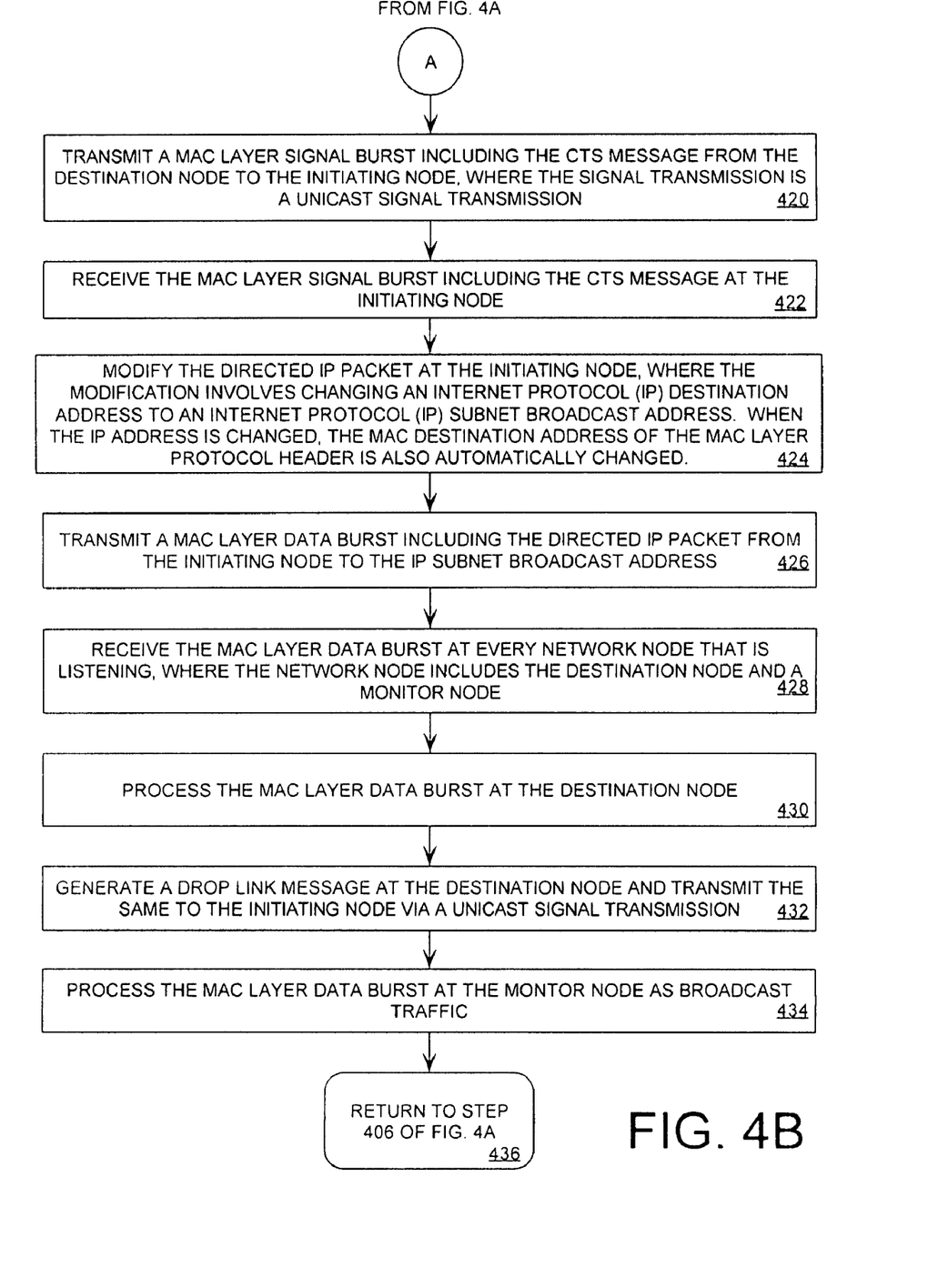

Referring now to FIGS. 4A-4B, there is provided a flow diagram of a method 400 for enabling the promiscuous monitoring of network communications by an IP-enabled monitor device. As shown in FIG. 4A, the method 400 begins at step 402 and continues with step 406. In step 406, a node associated with wireless network 100 determines that there is a need to communicate a message to one of the other nodes in the wireless network 100. Such a need can arise for several different reasons. For example, in the wireless network 100, a sensor node 102, 108, 114 can detect a physical intrusion which triggers an alert message. Alternatively, a relay node 104, 110, 112 can receive a message from another node in the network (e.g. a sensor node), which message then needs to be propagated along a communication path toward a central node 106. Still, other situations can trigger a network communication event. Regardless of the reason a message needs to be communicated, the node which needs to send such message shall be referred to herein as the "initiating node".

Once an initiating node determines that there is a need to communicate a message, it can begin that process by generating a directed internet protocol (IP) packet. Internet protocol packets are described generally above in relation to FIG. 3A. The term "directed internet protocol packet" refers to an IP packet which has one specific node as its destination address. In order to determine a proper address and timing data needed for generating the IP packet, step 408 is performed. In step 408, the initiating node performs actions to access an internal memory device (not shown) and retrieve data from a table stored therein.

After the completion of step 408, the method 400 continues with step 410. In step 410, the initiating node performs actions to process the data obtained in step 408. For example, such actions can include identifying a particular one of the nodes in FIG. 1, to which a message is to be communicated. For convenience, such node shall be referred to herein as a destination node. For example, a destination node can be a relay node 104, 110, 112 that is part of a communication route for relaying data to a central node 106. The destination node can also be a central node 106. The initiating node also performs actions to process the data obtained in step 408 to identify a time period when a receiver associated with the identified destination node will be activated.

Upon completing step 410, the method 400 continues with step 412. In step 412, the initiating node generates a request to send (RTS) message. The RTS message is a directed IP packet message, meaning that it is specifically addressed to the recipient node. In this regard, the RTS message can be said to be a unicast type message. The RTS message is a notification which informs the recipient node that the initiating node seeks to send a data message.

The RTS message is transmitted by the initiating node during a known time period (identified in step 408) during which the recipient node has activated its receiver in order to listen for such messages. Thereafter, step 414 is performed where the initiating node communicates the RTS message to the destination node. This communication can include transmitting a MAC layer signal burst including the RTS message from the initiating node to the destination node during a pre-determined period of time. MAC layer signal bursts are well known to those skilled in the art, and therefore will not be described in great detail herein. However, it should be appreciated that the phrase "MAC layer signal burst" refers to a type of signal transmission that combines a relatively high data signaling rate with a relatively short transmission time. This pre-determined period of time advantageously includes the time period when a receiver associated with the destination node is activated. Step 414 can also involve saving a timestamp in the internal memory device (not shown) when the MAC layer signal burst is transmitted. The timestamp can be used by the initiating node to compute a time offset. The time offset can be used by the initiating node to synchronize subsequent communications between itself and the destination node.

Subsequent to step 414, step 416 is performed. In step 416, the MAC layer signal burst including the RTS message is received at the destination node. In step 418, the destination node generates a clear to send (CTS) message. The CTS message is a directed IP packet message, meaning that it is specifically addressed to the initiating node. In this regard, the CTS message can be said to be a unicast type message similar to the RTS message.

The CTS message may include timing information indicating a local time increment in which the MAC layer signal burst was received at the destination node. Stated differently, the CTS message includes information identifying how much time has elapsed between the occurrence of a start time associated with a start of a receive duty cycle epoch and the receipt of the MAC layer signal burst at the destination node. Notably, this time increment and timing information can be used by the initiating node to re-synchronize the timing of communications between itself and the destination node. After step 418, the method 400 continues with step 420 of FIG. 4B.

Referring now to FIG. 4B, step 420 is performed where the destination node transmits a MAC layer signal burst including the CTS message to the initiating node. Subsequently, step 422 is performed where the initiating node receives the CTS message. It should be noted that the initiating node's receiver is activated for a pre-defined period of time after it transmits an RTS message. As such, the initiating node is expecting receipt of a CTS message immediately after transmitting an RTS message. The pre-defined period of time is selected in accordance with a particular wireless network 100 application. For example, the pre-defined period of time is selected to be fifty (50) milliseconds. Still, the invention is not limited in this regard.

In step 424, the initiating node performs actions to modify the directed IP packet generated in step 406 of FIG. 4A. The packet modification involves changing the internet protocol (IP) destination address 360 of the network layer protocol header 310 to an internet protocol (IP) subnet broadcast address. IP subnet broadcast addresses are well known to those skilled in the art, and therefore will not be described in detail herein.

It should be noted that if the IP destination address is modified prior to the RTS/CTS message transmissions then the initiating node will not generate and transmit an RTS message to the destination node. Rather, the initiating node will transmit the IP packet as a broadcast message. In such a scenario, the destination node will not send a response message to the initiating node indicating that the IP packet was received. Again, it should be appreciated that the RTS/CTS messaging configuration advantageously provides a means for (a) establishing a direct communications link between the initiating node and the destination node and (b) guaranteeing that the destination node receives the IP packet. As such, it is advantageous to modify the IP packet after the direct communications link is established between the initiating node and the destination node.

As a result of the destination address 360 change in step 424, the MAC destination address 350 is automatically changed from a unicast address to a broadcast address. It should be noted that this automatic change occurs as a result of a standard feature of a conventional protocol stack (described above in relation to FIG. 2). However, it should be appreciated that the IP subnet broadcast address is an IP address that allows information to be sent to all nodes on a given subnet. The phrase "IP address" refers to a unique address that the nodes use in order to identify and communicate with each other on the communications network utilizing an IP protocol standard. The term "subnet" refers to an identifiable group of nodes in a communications network.

Figure 6:
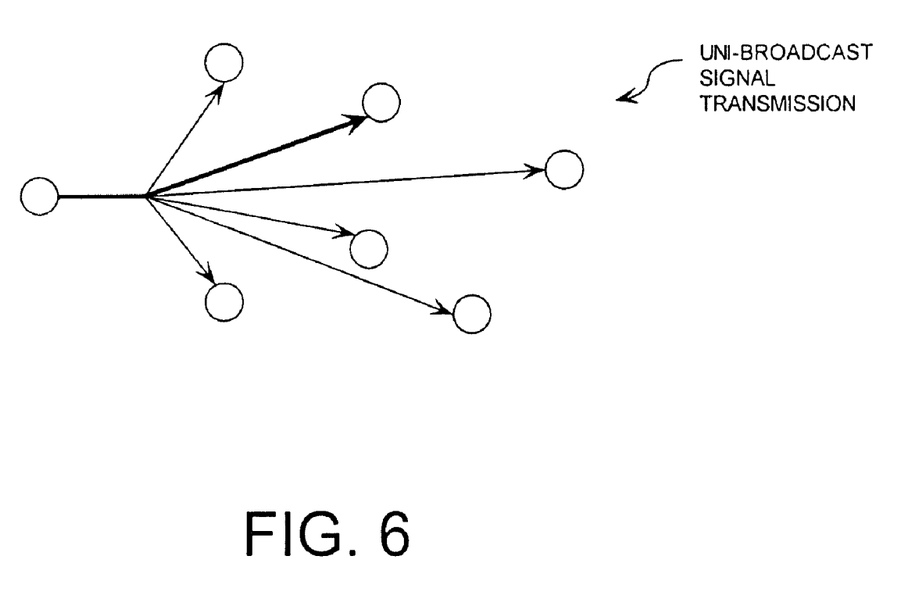
FIG. 6 is a schematic illustration of a uni-broadcast signal transmission that is useful for understanding the present invention.

After modifying the directed IP packet, step 426 is performed. In step 426, the initiating node transmits a MAC layer data burst including the modified directed IP packet to the IP subnet broadcast address. In this regard, it should be understood that the modified directed IP packet is not addressed to a particular node. As such, the modified directed IP packet is communicated to every device that is listening as well as the destination node. In effect, the data transmission is a uni-broadcast signal transmission. The phrase "uni-broadcast signal transmission" as used herein refers to a transmission of a signal including a modified IP packet to a plurality of nodes in a communications network, where the modified IP packet includes an IP subnet broadcast address. A schematic illustration of a uni-broadcast signal transmission is provided in FIG. 6.

Referring again to FIG. 4B, the method 400 continues with step 428. In step 428, the MAC layer data burst is received at every node that is listening. Such nodes include the destination node and the monitor node 120. Thereafter, step 430 is performed where the MAC layer data burst is processed at the destination node as unicast traffic. It should be noted that the broadcast message is processed as unicast traffic because the destination node is in an RTS/CTS state. In this RTS/CTS state, a unicast communications link is established between the initiating node and the destination node. As such, the destination node is expecting a unicast transmission from the initiating node and will process a received IP packet as unicast traffic. It should also be noted that the destination node will perform actions (a) to determine a next relay node that is part of a communication path to a central node and (b) to forward the packet to the identified relay node. This processing can involve obtaining the modified IP packet from the MAC layer data burst. Subsequently, the method 400 continues with step 432. In step 432, the destination node generates a drop link message. Drop link messages are well known to persons skilled in the art, and therefore will not be described in detail herein. However, it should be appreciated that the drop link message is provided to ensure that the communications link between the initiating node and the destination node is timely terminated. Upon termination of the communication link, other nodes can transmit communications to the relay node. Step 432 also involves transmitting a MAC layer signal burst including the drop link message to the initiating node. The signal transmission is a unicast signal transmission. Stated differently, the MAC layer signal is addressed only to the initiating node. In step 434, the MAC layer data burst is processed at the monitor node 120 as broadcast traffic. It should be understood that the monitor node 120 in not in an RTS/CTS state. As such, the monitor node 120 is not expecting a unicast transmission from the initiating node. Accordingly, the monitor node 120 will process a received packet as broadcast traffic rather than as unicast traffic. This processing can generally involve forwarding the IP data from the MAC layer 210 to the application layer 202. In the application layer 202, the IP data can be displayed, stored or processed in accordance with a particular user defined application. After step 434, step 436 is performed where the method 400 returns to step 404 of FIG. 4A.

Figure 5:
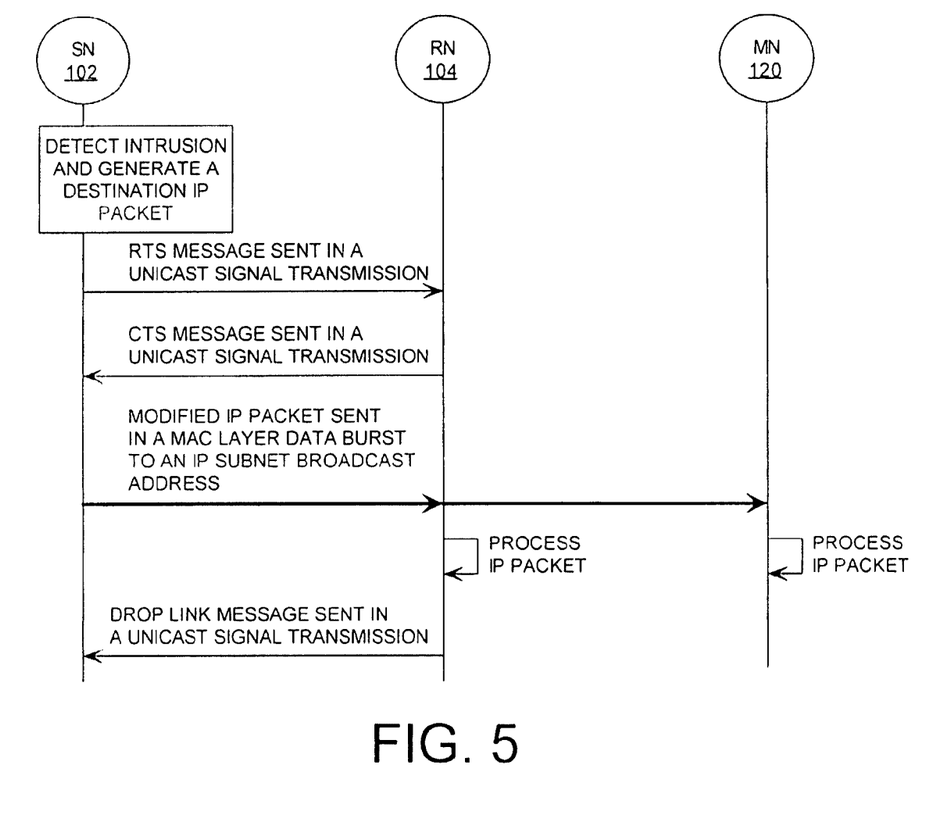
FIG. 5 is a sequence diagram for a network communication of a directed IP packet from a sensor node to a relay node, where the network communication is being promiscuously monitored by a monitor node.

Referring now to FIG. 5, there is provided a sequence diagram for a communication of between nodes 102, 104, 120 of the wireless network 100. The nodes 102, 104, 120 implement the method 400 described above in relation to FIGS. 4A-4B. As shown in FIG. 5, the sensor node 102 detects an intrusion and generates a directed IP packet 300. Thereafter, the sensor node 102 generates an RTS message and communicates the same to the relay node 106 during a pre-defined period of time. Upon receipt of the RTS message, the relay node 106 generates a CTS message and communicates the same to the sensor node 202. Upon receipt of the CTS message, the sensor node 102 performs actions to modify the directed IP packet 300. This packet modification involves changing the IP destination address 360 of the network layer protocol header 310 to an IP subnet broadcast address. As a result of the IP destination address change, the MAC destination address 350 of the MAC layer protocol header 306 is automatically changed. Consequently, a signal including the modified packet can be sent as a broadcast transmission. After modifying the directed IP packet, the sensor node 102 transmits a MAC layer data burst including the modified directed IP packet. In the exemplary embodiment shown in FIG. 5, the listening nodes include the relay node 104 and the monitor node 120. As such, the relay node 104 and the monitor node 120 receive the MAC layer data burst. Upon receipt of the MAC layer data burst, each of the nodes 104, 120 performs actions to process the modified directed IP packet. After processing the modified directed IP packet, the relay node 104 generates a drop link message and transmits a MAC layer signal burst including the drop link message to the sensor node 102. The signal transmission is a unicast signal transmission. Stated differently, the MAC layer signal is addressed only to the sensor node 102. Upon receipt of the drop link message, the sensor node 102 performs actions to terminate its communications link with the relay node 104.

In light of the forgoing description of the invention, it should be recognized that the present invention can be realized in hardware, software, or a combination of hardware and software. A method for decoding an encoded sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for enabling a promiscuous monitoring of network communications by an IP-enabled device that ignores received messages directed to unicast addresses of other devices, comprising:
   detecting, by a first node, a physical intrusion within a predetermined geographic area;
   in response to said detection of said physical intrusion, performing by said first node a plurality of operations including
      generating a directed IP packet comprising an IP destination address for a second node;
      establishing a unicast communications session with said second node in anticipation of communicating said directed IP packet exclusively to said second node;
      subsequent to establishing said unicast communications session, modifying said directed IP packet by changing said IP destination address of said directed IP packet to an IP subnet broadcast address of said second node;
      transmitting within said unicast communication session a uni-broadcast signal including said directed IP packet that has been modified to said second node using said IP subnet broadcast address;
   receiving said uni-broadcast signal at said second node as a unicast transmission and at a monitoring node as a broadcast transmission, wherein said monitoring node is said IP-enabled device configured to monitor communications between said first and second nodes; and
   processing said directed IP packet that has been modified at said second and said monitoring nodes, wherein said directed IP packet is processed at said monitoring node as broadcast traffic and said directed IP packet is processed at said second node as unicast traffic.

2. The method according to claim 1, wherein said modifying said directed IP packet step further comprises selecting said IP destination address to be an IP destination address of a network layer protocol header.

3. The method according to claim 1, wherein said unicast communications session is established by transmitting a first unicast signal including a request to send message from said first node to said second node.

4. The method according to claim 3, wherein said transmitting said first unicast signal further comprises transmitting a MAC layer signal burst including said request to send message from said first node to said second node.

5. The method according to claim 3, wherein said unicast communications session is further established by transmitting said second unicast signal including a clear to send message from said second node to said first node in response to said first unicast signal.

6. The method according to claim 5, wherein said transmitting a second unicast signal further comprises transmitting a MAC layer signal burst including said clear to send message from said second node to said first node.

7. The method according to claim 1, wherein said transmitting a uni-broadcast signal further comprises transmitting a MAC layer data burst including said directed IP packet that has been modified from said first node to said IP subnet broadcast address.

8. The method according to claim 1, further comprising the step of transmitting a unicast signal including a drop link message from said second node to said first node after said second node receives said uni-broadcast signal.

9. The method according to claim 1, further comprising selecting said second node to be a relay node that is part of a route to a central node.

10. A method for enabling a promiscuous monitoring of network communications by an IP-enabled device that ignores received messages directed to unicast addresses of other devices, comprising:
   detecting, by a first node, a physical intrusion within a predetermined geographic area;
   in response to said detection of said physical intrusion, performing by said first node a plurality of operations including
      generating a directed IP packet comprising an IP destination address for a second node;
      transmitting a first unicast signal including a request to send message to said second node for establishing a unicast communication session with said second node;
      receiving a second unicast signal including a clear to send message from said second node;
      in response to receiving said clear to send message, modifying said directed IP packet by changing said IP destination address of said directed IP packet to an IP subnet broadcast address of said second node; and
      transmitting within said unicast communication session a uni-broadcast signal including said directed IP packet that has been modified to said-second node using said IP subnet broadcast address;
   receiving said uni-broadcast signal at said second node as a unicast transmission and at a monitoring node as a broadcast transmission, wherein said monitoring node is said IP-enabled device configured to monitor communications between said first and second nodes; and
   processing said directed IP packet at said second and said monitoring nodes, wherein said directed IP packet is processed at said monitoring node as broadcast traffic and said directed IP packet is processed at said second node as unicast traffic.

11. The method according to claim 10, wherein said modifying said directed IP packet step further comprises selecting said IP destination address to be an IP destination address of a network layer protocol header.

12. The method according to claim 10, wherein said transmitting said first unicast signal further comprises transmitting a MAC layer signal burst including said request to send message from said first node to said second node.

13. The method according to claim 10, wherein said transmitting said second unicast signal further comprises transmitting a MAC layer signal burst including said clear to send message from said second node to said first node.

14. The method according to claim 10, wherein said transmitting said uni-broadcast signal further comprises transmitting a MAC layer data burst including said directed IP packet that has been modified from said first node to said IP subnet broadcast address.

15. The method according to claim 10, further comprising transmitting a unicast signal including a drop link message from said second node to said first node after said second node receives said uni-broadcast signal.

16. The method according to claim 10, further comprising selecting said second node to be a relay node that is part of a route to a central node.

* * * * *